US012378737B2

(12) United States Patent
Whitford

(10) Patent No.: US 12,378,737 B2
(45) Date of Patent: Aug. 5, 2025

(54) VEHICLE MITIGATION SYSTEM

(71) Applicant: Peter Duncan Whitford, Pasadena, CA (US)

(72) Inventor: Peter Duncan Whitford, Pasadena, CA (US)

(*) Notice: Subject to any disclaimer, the term of this patent is extended or adjusted under 35 U.S.C. 154(b) by 0 days.

(21) Appl. No.: 18/244,055

(22) Filed: Sep. 8, 2023

(65) Prior Publication Data

US 2024/0084532 A1 Mar. 14, 2024

Related U.S. Application Data

(60) Provisional application No. 63/404,842, filed on Sep. 8, 2022.

(51) Int. Cl.

| | |
|---|---|
| ***E01F 13/02*** | (2006.01) |
| ***E01F 13/06*** | (2006.01) |
| ***E01F 13/12*** | (2006.01) |
| ***E05C 1/04*** | (2006.01) |
| ***E05C 3/06*** | (2006.01) |
| ***E05C 21/00*** | (2006.01) |

(52) U.S. Cl.

CPC .............. *E01F 13/06* (2013.01); *E01F 13/02* (2013.01); *E01F 13/12* (2013.01); *E05C 1/04* (2013.01); *E05C 3/06* (2013.01); *E05C 21/00* (2013.01)

(58) Field of Classification Search

CPC ............ E01F 13/06; E01F 13/02; E01F 13/12

See application file for complete search history.

(56) References Cited

U.S. PATENT DOCUMENTS

| | | | |
|---|---|---|---|
| 1,449,518 | A | 3/1923 | Lawson |
| 1,631,416 | A | 6/1927 | Howard |
| 2,777,227 | A | 1/1957 | Imhoff |
| 3,065,680 | A | 11/1962 | Wiedman, Sr. |
| 3,135,062 | A | 6/1964 | Guerco |

(Continued)

FOREIGN PATENT DOCUMENTS

| | | | |
|---|---|---|---|
| EP | 3792401 | B1 | 7/2022 |
| GB | 158281 | A | 2/1921 |

(Continued)

OTHER PUBLICATIONS

Youtube: Meridian Rapid Defense Group—Archer Beam Gate Deployment and Use (Year: 2019).*

(Continued)

*Primary Examiner* — Daniel J Troy
*Assistant Examiner* — Susan M. Heschel
(74) *Attorney, Agent, or Firm* — Patterson + Sheridan, LLP

(57) ABSTRACT

A vehicle mitigation system comprises a first portable barrier, a second portable barrier, and a gate assembly comprising a beam. The gate assembly is pivotally attached to the second portable barrier, and the beam is capable of rotating between a closed position and an open position. The beam in the closed position is substantially parallel to a surface on which the first and second portable barriers are positioned. The beam in the open position is no longer parallel to the surface and has been raised vertically away from the surface. The gate assembly has at least one arrestor cable attached between the first portable barrier and the second portable barrier such that the arrestor cable spans a distance between the first and second portable barriers.

18 Claims, 12 Drawing Sheets

(56) References Cited

U.S. PATENT DOCUMENTS

| | | | |
|---|---|---|---|
| 4,480,405 A | 11/1984 | Ferguson | |
| 4,630,395 A | 12/1986 | Nasatka | |
| 4,854,767 A | 8/1989 | Sasaki | |
| 4,968,177 A | 11/1990 | Bechtold | |
| 4,998,843 A | 3/1991 | Mothe | |
| 5,145,278 A | 9/1992 | Lohrmann | |
| 5,228,237 A | 7/1993 | Nasatka | |
| 5,356,119 A | 10/1994 | Schock | |
| 5,549,410 A | 8/1996 | Beryozkin et al. | |
| 5,997,211 A | 12/1999 | Chou | |
| 6,079,904 A | 6/2000 | Trisl | |
| 6,296,234 B1 | 10/2001 | De Boer | |
| 6,679,649 B1 | 1/2004 | Capolupo | |
| 6,702,512 B1 | 3/2004 | Reale | |
| 6,767,158 B1 | 7/2004 | Consolazio et al. | |
| 6,843,614 B2 | 1/2005 | Yodock, Jr. et al. | |
| 6,886,299 B2 | 5/2005 | Gower | |
| 6,907,811 B2 | 6/2005 | White | |
| 6,962,245 B2 | 11/2005 | Ray et al. | |
| 7,083,357 B2 | 8/2006 | Lamore | |
| 7,101,112 B2 | 9/2006 | Burns et al. | |
| 7,140,802 B2 | 11/2006 | Lamore | |
| 7,172,176 B1 | 2/2007 | Eastland | |
| 7,264,417 B1 | 9/2007 | Nasatka | |
| 7,320,557 B1 | 1/2008 | Potter | |
| 7,494,112 B2 | 2/2009 | Fromm | |
| 7,819,604 B2 | 10/2010 | Breed | |
| 7,862,251 B2 * | 1/2011 | Lyddon | E01F 13/12 404/6 |
| 7,918,622 B2 | 4/2011 | Whitford | |
| 7,959,373 B1 | 6/2011 | Brown | |
| 8,215,866 B2 * | 7/2012 | Whitford | F41H 5/14 404/9 |
| 10,370,808 B2 * | 8/2019 | Neusch | E01F 13/12 |
| 10,407,852 B2 | 9/2019 | Dickinson et al. | |
| 10,900,182 B2 | 1/2021 | Harris et al. | |
| 10,941,531 B2 | 3/2021 | Dickinson et al. | |
| 2002/0182007 A1 | 12/2002 | Yodock, Jr. et al. | |
| 2003/0159356 A1 | 8/2003 | Russell | |
| 2004/0089143 A1 | 5/2004 | Gilon | |
| 2005/0220536 A1 | 10/2005 | Blair et al. | |
| 2005/0254892 A1 | 11/2005 | Yodock et al. | |
| 2006/0078380 A1 | 4/2006 | Dehart | |
| 2006/0233607 A1 | 10/2006 | Buckley et al. | |
| 2007/0272911 A1 | 11/2007 | Fromm | |
| 2008/0157493 A1 | 7/2008 | McConkey et al. | |
| 2008/0223857 A1 | 9/2008 | Palley et al. | |
| 2009/0067923 A1 | 3/2009 | Whitford | |
| 2009/0092443 A1 | 4/2009 | Friedman et al. | |
| 2009/0250674 A1 | 10/2009 | Darcy | |
| 2010/0202829 A1 | 8/2010 | Gelfand et al. | |
| 2011/0271597 A1 | 11/2011 | Wilkinson et al. | |
| 2012/0168702 A1 | 7/2012 | Fromm | |
| 2016/0053450 A1 | 2/2016 | Neusch | |
| 2016/0160459 A1 | 6/2016 | Orner, Jr. | |
| 2017/0204575 A1 | 7/2017 | Klein | |
| 2017/0356203 A1 | 12/2017 | Nagel | |
| 2019/0226167 A1 | 7/2019 | Gerrard et al. | |
| 2019/0330812 A1 | 10/2019 | Ptacek et al. | |
| 2022/0259889 A1 | 8/2022 | Jordan | |
| 2023/0257946 A1 | 8/2023 | Whitford | |

FOREIGN PATENT DOCUMENTS

| | | | |
|---|---|---|---|
| GB | 2178094 A | 2/1987 | |
| WO | 2006/088428 A1 | 8/2006 | |
| WO | 2007040626 A2 | 4/2007 | |
| WO | 2020170282 A1 | 8/2020 | |
| WO | 2023/229788 A2 | 11/2023 | |

OTHER PUBLICATIONS

Youtube: Meridian Rapid Defense Group- Construction Site Vehicle Barriers Adding Protection (Year: 2020).*

International Search Report and Written Opinion dated Nov. 17, 2023, prepared in International Application No. PCT/US2023/032320.

Meridian Rapid Defense Group, Archer Beam Gate Deployment and Use. YouTube. Sep. 5, 2019. [Retrieved on Oct. 23, 2019]. Retrieved from Internet: ,URL: https://www.youtube.com/watch?v=a5EqkkAh-dY. entire video.

International Search Report and Written Opinion dated Dec. 19, 2023 and prepared in PCT/US2023/020290.

Meridian Rapid Defense Group, Ventura CA Parade Protection. YouTube. Apr. 19, 2022. [Retrieved on Nov. 13, 2023]. Retrieved from internet: <URL: https://www.youtube.com/watch?v=0TFzLOVteBY>, entire video.

Fromm Barriers, Inc., Instant Protection When the Clock is Ticking, at least as early as Sep. 2006, 2 pages.

Meridian Rapid Defense Group, Better Barriers for the 21st Century—Archer 1000 Anti-Vehicle Barrier System the Wayback Machine—https://web.archive.org/web/20090804105407/http://www.betterbarriers.com:80/products/archer1000/, at least as early as Aug. 4, 2009.

Meridian Rapid Defense Group, Better Barriers for the 21st Century—Transportation Products, the Wayback Machine—https://webarchive.org/web/20090804105417/http://www.betterbarriers.com:80/products/transportation/, at least as early as Aug. 4, 2009.

Meridian Rapid Defense Group, Better Barriers for the 21st Century—Archer 500, undated but at least as early as Mar. 27, 2014.

Meridian Rapid Defense Group, Better Barriers for the 21st Century—Archer 750, undated but at least as early as Jan. 8, 2016.

Meridian Rapid Defense Group, Better Barriers for the 21st Century—Rapid Gate, Archer Beam Gate, Archer Active Gate, the Wayback Machine—https://web.archive.org/web/20090803215738/http://www.betterbarriers.com:80/products/rapid_gate/, 2009 Meridian Rapid Defense Group, LLC, at least as early as Aug. 3, 2009.

Delta Scientific Corporation Portable Barriers:MP5000 posted on DeltaScientific.com original date unknown. Publication date unknown—first cited to the USPTO on Jul. 22, 2008 in U.S. Pat. No. 7,918,622.

General Dynamics Portable Vehicle Arresting Barrier General Dynamics advertisement original date unknown. Publication date unknown—first cited to the USPTO on Jul. 22, 2008 in U.S. Pat. No. 7,918,622.

The Mifram Group Modular Vehicle Barrier posted on MiframSecurity.com original date unknown. Publication date unknown—first cited to the USPTO on Jul. 22, 2008 in U.S. Pat. No. 7,918,622.

The Mojo Barriers Mojo Steel Barrier posted on MojoBarriers.com original date unknown. Publication date unknown—first cited to the USPTO on Jul. 22, 2008 in U.S. Pat. No. 7,918,622.

Delta Scientific Corporation product specification for model DSC2000 Phalanx Barrier posted on Delta Scientific Website dated Oct. 11, 2006.

Carnahan Conference Paper Albuquerque New Mexico Oct. 2004 Presented by Nigel Buckley. Publication date unknown—first cited to the USPTO on Jul. 22, 2008 in U.S. Pat. No. 7,918,622.

International Search Report and Written Opinion dated Jul. 21, 2023, prepared in International Application No. PCT/US2023/020291.

International Search Report and Written Opinion dated Sep. 26, 2023, prepared in International Application No. PCT/US2023/027296.

* cited by examiner

VEHICLE MITIGATION SYSTEM

CROSS-REFERENCE TO RELATED APPLICATIONS

This application claims the benefit of and priority to U.S. Provisional Application No. 63/404,842, filed on Sep. 8, 2022, which is hereby incorporated by reference in its entirety herein. This application also incorporates by reference in its entirety the disclosure of U.S. patent application Ser. No. 18/220,142, filed Jul. 10, 2023.

TECHNICAL FIELD

The present disclosure relates generally to the field of vehicle mitigation systems, and more specifically to portable barriers and moveable gates capable of being rapidly deployed for protection against vehicular and military style breaches.

BACKGROUND

Vehicle intrusions into restricted, protected or secured areas are troublesome due to the damage that can be caused, both in terms of property damage and injury or loss of life. There are many scenarios in which it is desired to restrict vehicular traffic in an area. Examples include road construction and other construction sites in order to protect construction workers and equipment. Others include high-profile or highly attended events like parades, sporting events, and political gatherings, where it is desired to keep unauthorized vehicles away from certain areas, especially those that have large gatherings of pedestrians. Still others include secure facilities such as military bases, governmental facilities or areas designated as restricted by law enforcement. While it is possible in some instances to install permanent barriers, many events or situations require that protection against vehicular intrusion be quickly provided and then removed following an event or situation calling for such protection.

BRIEF DESCRIPTION OF THE DRAWINGS

Illustrative examples of the present disclosure are described in detail below with reference to the attached drawing figures, which are incorporated by reference herein, and wherein.

Figure 1:
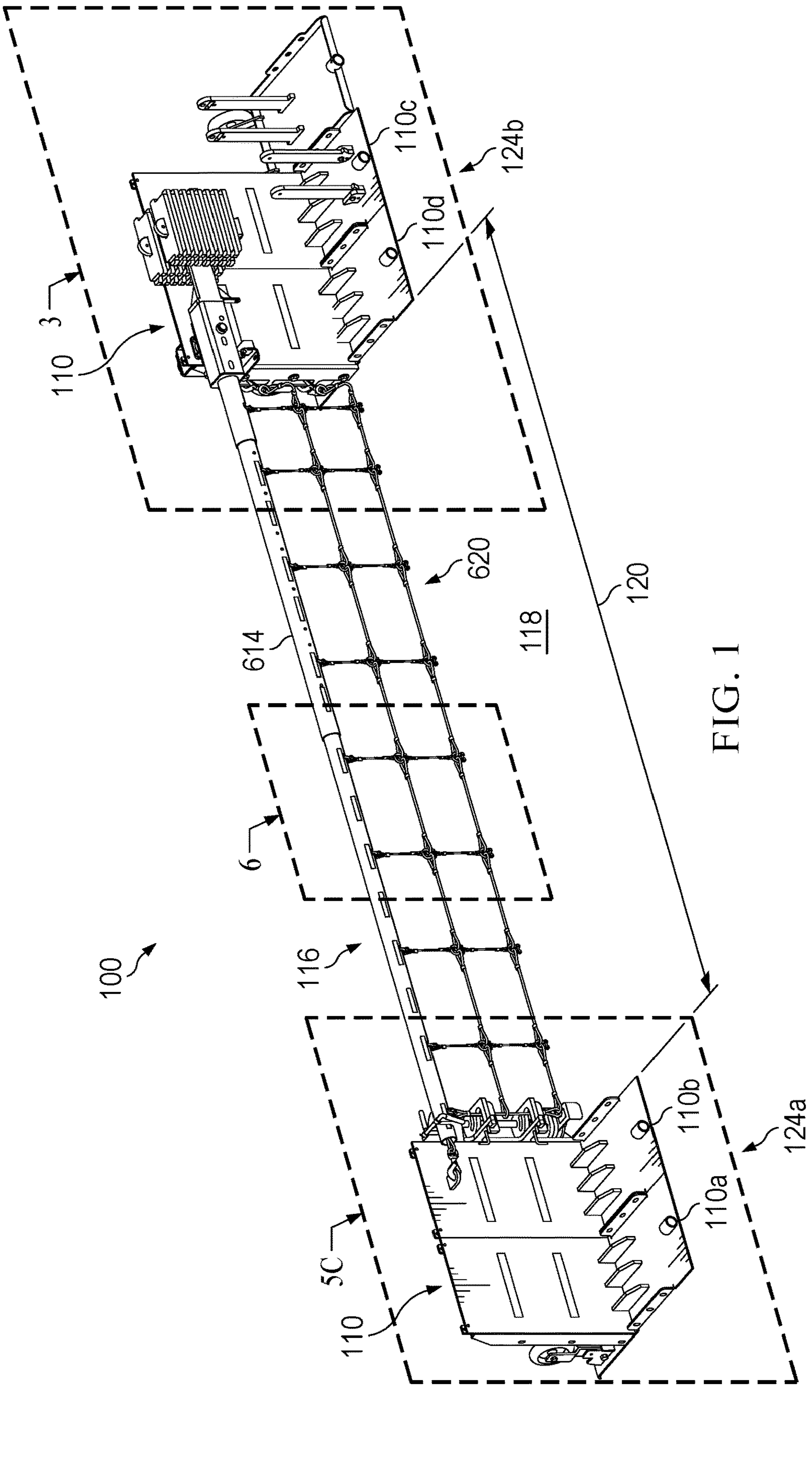
FIG. 1 illustrates a front perspective view of a vehicle mitigation system according to an embodiment.

The illustrated figures are only exemplary and are not intended to assert or imply any limitation with regard to the environment, architecture, design, or process in which different examples may be implemented.

DETAILED DESCRIPTION

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The present disclosure relates generally to the field of vehicle mitigation systems, and specifically to portable barriers and moveable gates capable of rapid deployment for protecting against vehicular and military style breaches. A vehicle mitigation system is described herein that includes a plurality of portable barriers that are positioned near an area that needs to be protected or secured. The portable barriers are arranged such that a spacing distance is provided between the barriers, and the barriers may be connected by a gate assembly that is capable of being moved between open and closed positions. Together, the barriers and the gate assembly are configured to absorb the kinetic energy of a vehicle as the vehicle contacts the vehicle mitigation system, and the barriers move with the vehicle following contact.

The portability of the vehicle mitigation system allows the system to be quickly deployed to areas requiring defense against vehicles and other traffic. The barriers are transported using a trailer and may be deployed by a single user with the assistance of a wheeled hauler. After positioning the barrier, the user may easily assemble and deploy the gate assembly to link the barriers together for additional protection.

FIGS. 1-8 illustrate several views of a vehicle mitigation system 100 according to an embodiment. The vehicle mitigation system may include four barriers, arranged in two pairs, and positioned with a gap or spacing distance between the two pair of barriers. A gate assembly is connected to at least one of the barriers and is capable of being opened to provide access between the pairs of barriers. When the gate assembly is closed and coupled to barriers on both sides of the gap, the system is configured to slow or stop an offending (errant or breaching) vehicle that attempts to pass through the gap. Together, the gate assembly and barriers are designed to surround the vehicle upon impact and drag the vehicle to a stop using the weight of the barriers, as well as teeth or other edges or protrusions provided at or near the base of the barriers that dig into the road surface or ground. While the embodiments illustrated herein may include a pair of barriers positioned on each side of the gap, a single portable barrier may be positioned on each side of the gap, or alternatively, more than two barriers may be positioned on either side of the gap. When multiple barriers are grouped together, the barriers may be rigidly connected to one another, or may be connected by additional high-strength cables or tethers, to provide additional resistance against breaching vehicles.

Unlike most security gates and gate installations, the vehicle mitigation system is not a fixed installation but rather is portable and mobile. By using portable barriers as a support structure for the gate assembly, it is not necessary to permanently attach supports to a road or other surface in the area that is being protected. The gate assembly itself is also capable of being easily assembled and disassembled, thereby further enabling the portability and mobility of the vehicle mitigation system. The gate assembly, by using modular components, also is capable of being customized to fit the gap that is between the barriers, and the distance of that gap can be selectively determined by the security requirements of the site being protected and by the placement of the barriers.

The vehicle mitigation system is easy to install and requires no electricity, hydraulics or heavy machinery to move into place. The system can be easily assembled and deployed by one person. Removal of the system is also time efficient, and the system can be easily relocated to other areas where demand for vehicular or other traffic control is desired.

Figure 2:
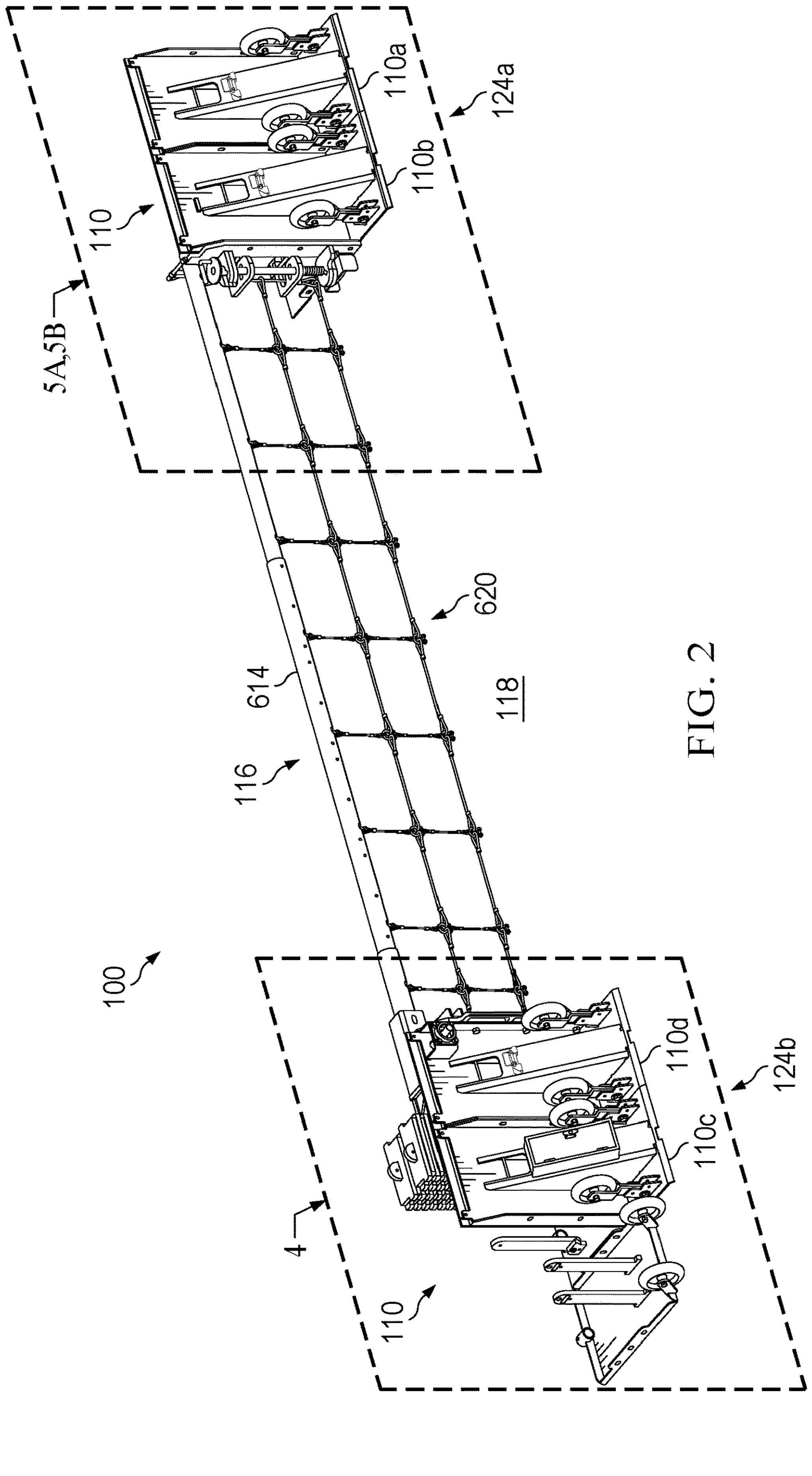
FIG. 2 illustrates a rear perspective view of the vehicle mitigation system of FIG. 1.

Referring more specifically to FIGS. 1 and 2, the vehicle mitigation system 100 according to an illustrative embodiment is illustrated. FIG. 1 depicts a front perspective view, while FIG. 2 depicts a rear perspective view of the vehicle mitigation system 100. Vehicle mitigation system 100 includes a plurality of portable barriers 110 and a gate assembly 116. Portable barriers 110 may be positioned on a surface 118 on both sides of a gap, or spacing distance 120. In some embodiment, the gap 120 may be a distance of 10, 12, or 14 feet depending on the security requirements of the site at which the vehicle mitigation system 100 is deployed. Operators deploying the barriers 110 position the barriers 110 to obtain the desired width or distance of the gap 120. While other gap distances, either shorter or longer, may be deployed in other embodiments, the gate assembly 116 would be sized appropriately as described herein to span the desired distance of the gap 120.

In the embodiment illustrated, a pair 124*a* of barriers is positioned on a first side of the gap 120 and a pair 124*b* of barriers is positioned on a second side of the gap 120. Pair 124*a* consists of an outer barrier 110*a* and an inner barrier 110*b*, which are rigidly connected to each other by bolts or other fasteners. The use of fasteners or other releasable means allows each of the barriers 110*a*, 110*b* to be individually moved to the deployment location and then coupled together. When it is desired to move or discontinue the use of the vehicle mitigation system 100, the barriers 110*a*, 110*b* may be disconnected from one another and then individually transported to a trailer or storage facility. Pair 124*b* includes an outer barrier 110*c* and an inner barrier 110*d*, which may be releasably coupled together in the same manner as barriers 110*a*, 110*b*.

In other embodiments, it may be desirable to only deploy a single barrier on each side of the gap 120. In these embodiments, it may not be necessary to have the heavier grounding capability afforded by two barriers on each side. Such may be the case for providing gated security for pedestrians only or for smaller vehicles such as small passenger cars, utility vehicles (UTVs), all-terrain vehicles (ATVs), motorcycles, or bicycles. Alternatively, a single barrier could be used on each side, even with larger vehicles being the security focus, if the weight of the barrier were increased. One advantage, however, of using two or even more barriers on each side is that the task of deployment is simpler and can be managed by one or two people. Each barrier is individually placed and then coupled to the adjacent barrier on a particular side of the gap. This eases the moving of the barrier since the total weight of the barrier assembly on a particular side is divided up among the individual barriers that are deployed. When especially large vehicles are expected in the area, or if higher speeds are expected from the targeted vehicles, it may be desirable to have three or even more barriers connected on each side of the gap.

Figure 3:
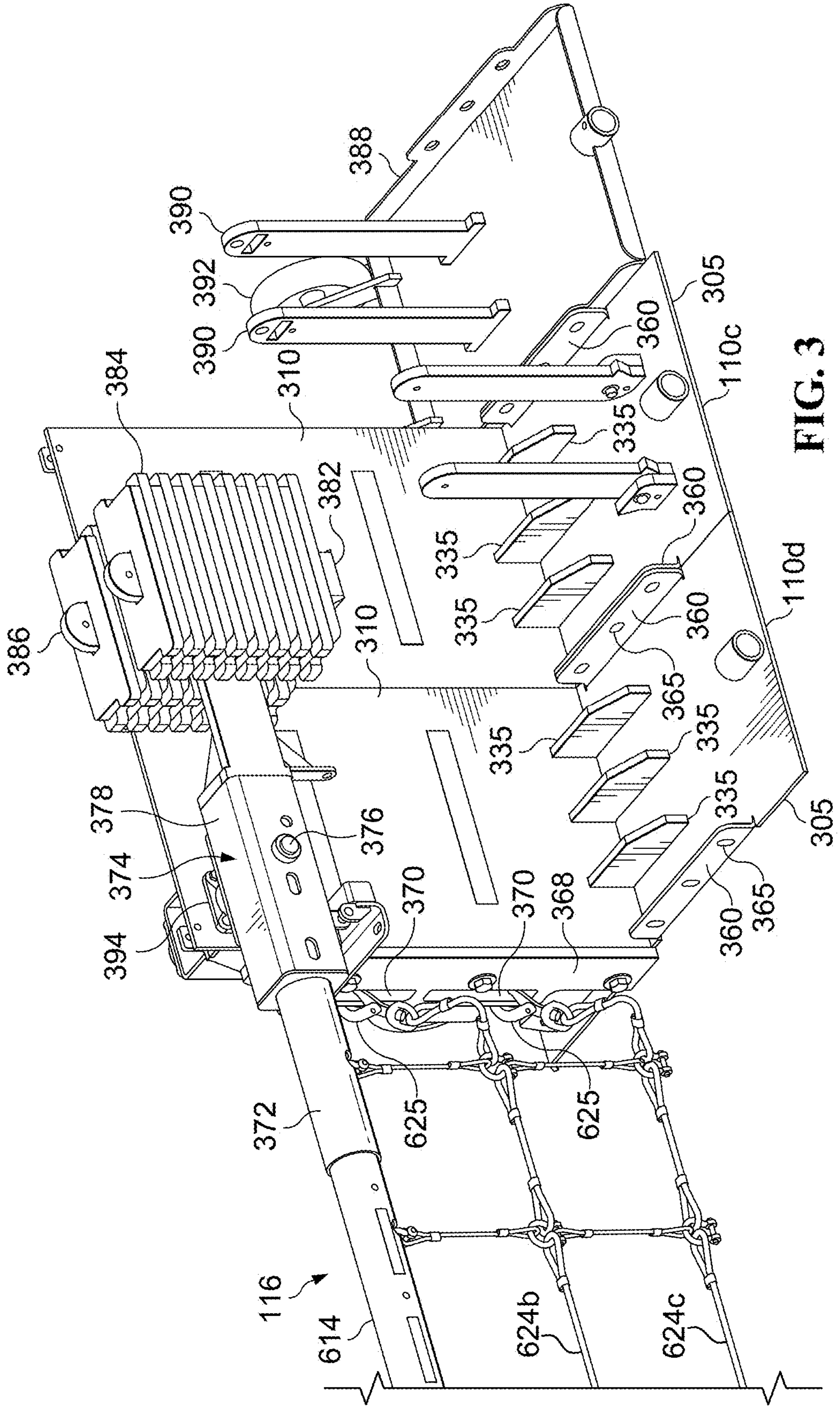
FIG. 3 represents an enlarged front perspective view of portable barriers of the vehicle mitigation system of FIG. 1.
Figure 4:
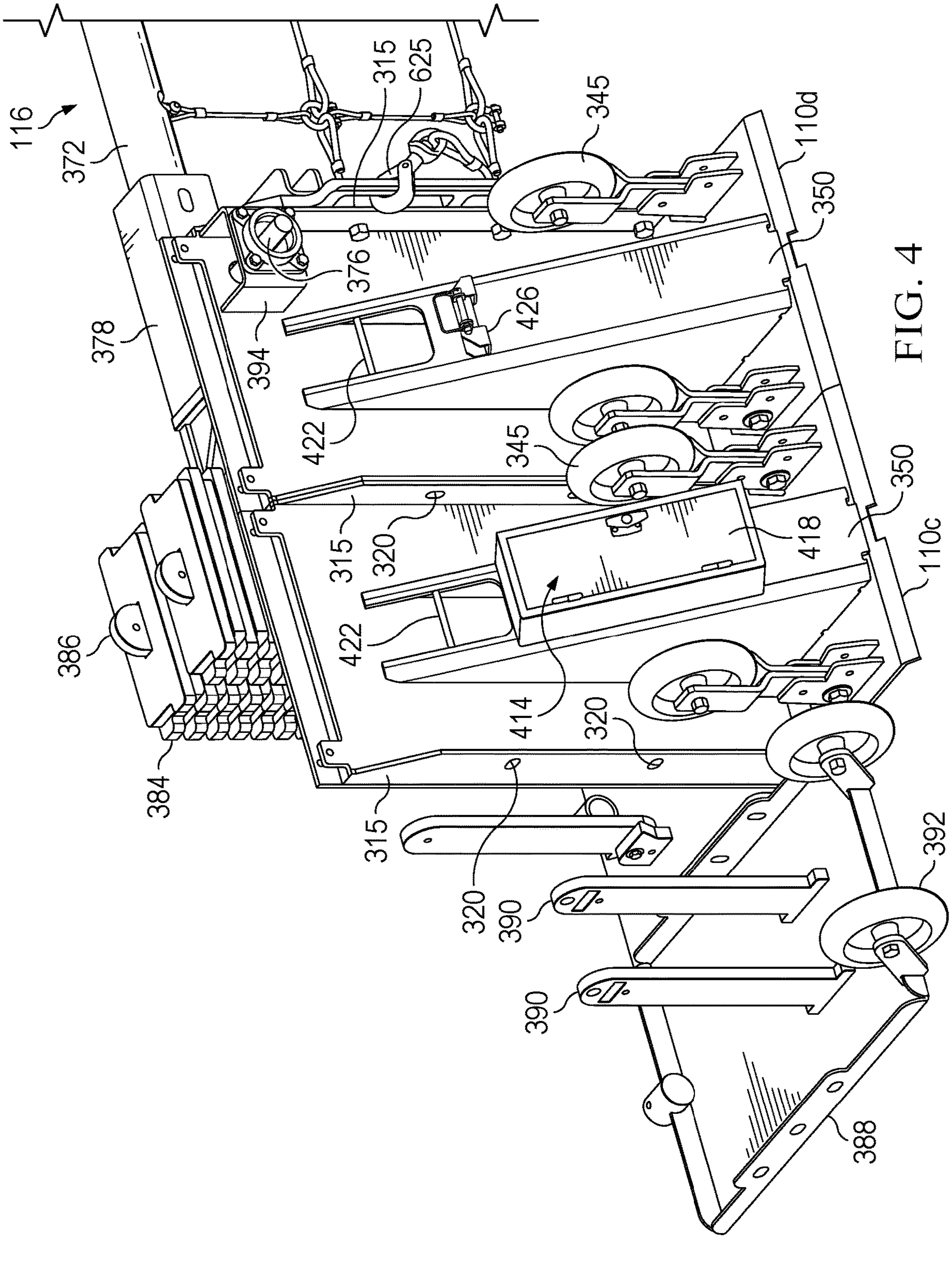
FIG. 4 represents an enlarged rear perspective view of portable barriers of the vehicle mitigation system of FIG. 1.
Figure 5A:
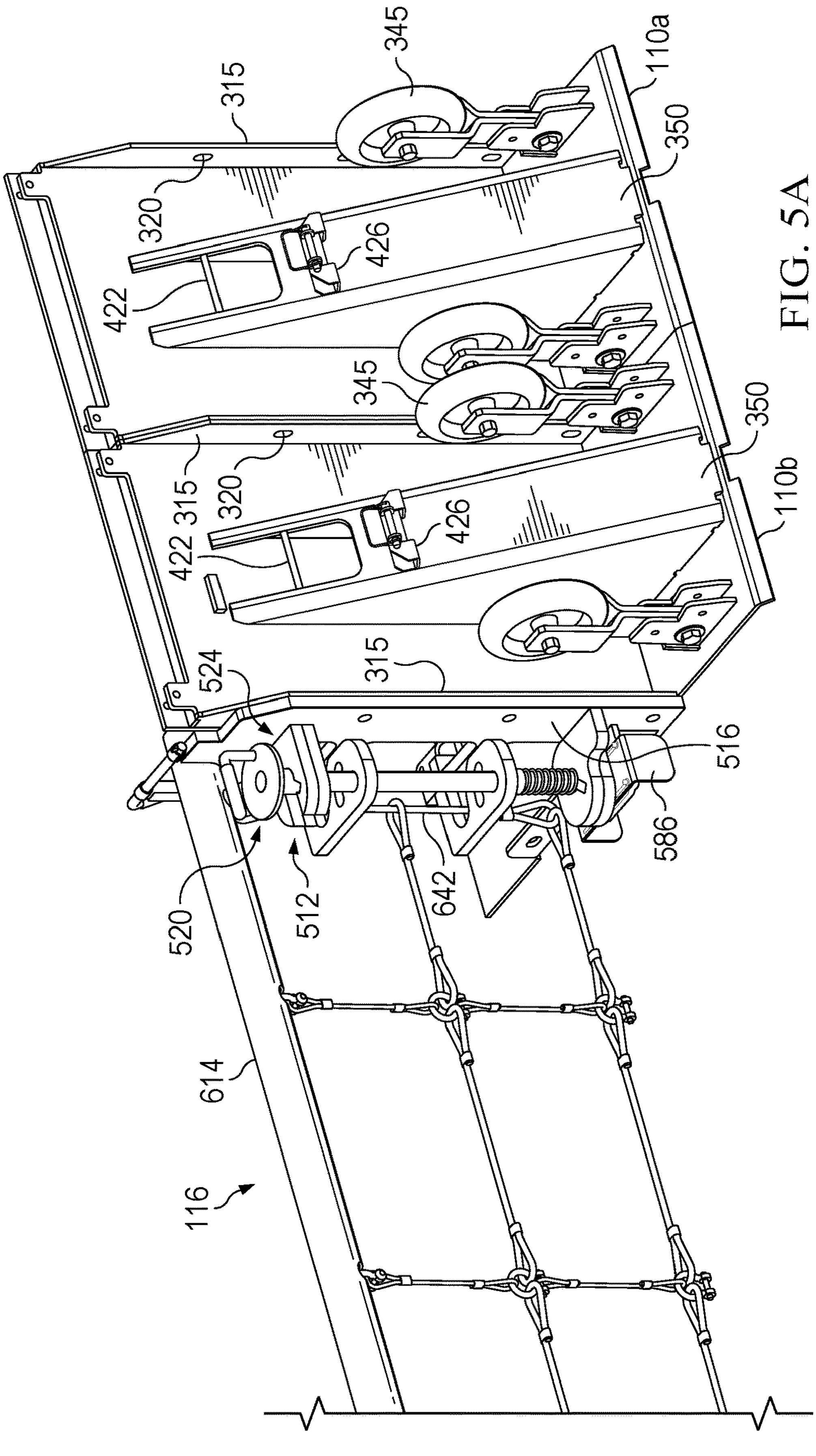
FIG. 5A represents an enlarged rear perspective view of a latch assembly in a closed position, the latch assembly coupled to a portable barrier of the vehicle mitigation system of FIG. 1.
Figure 5B:
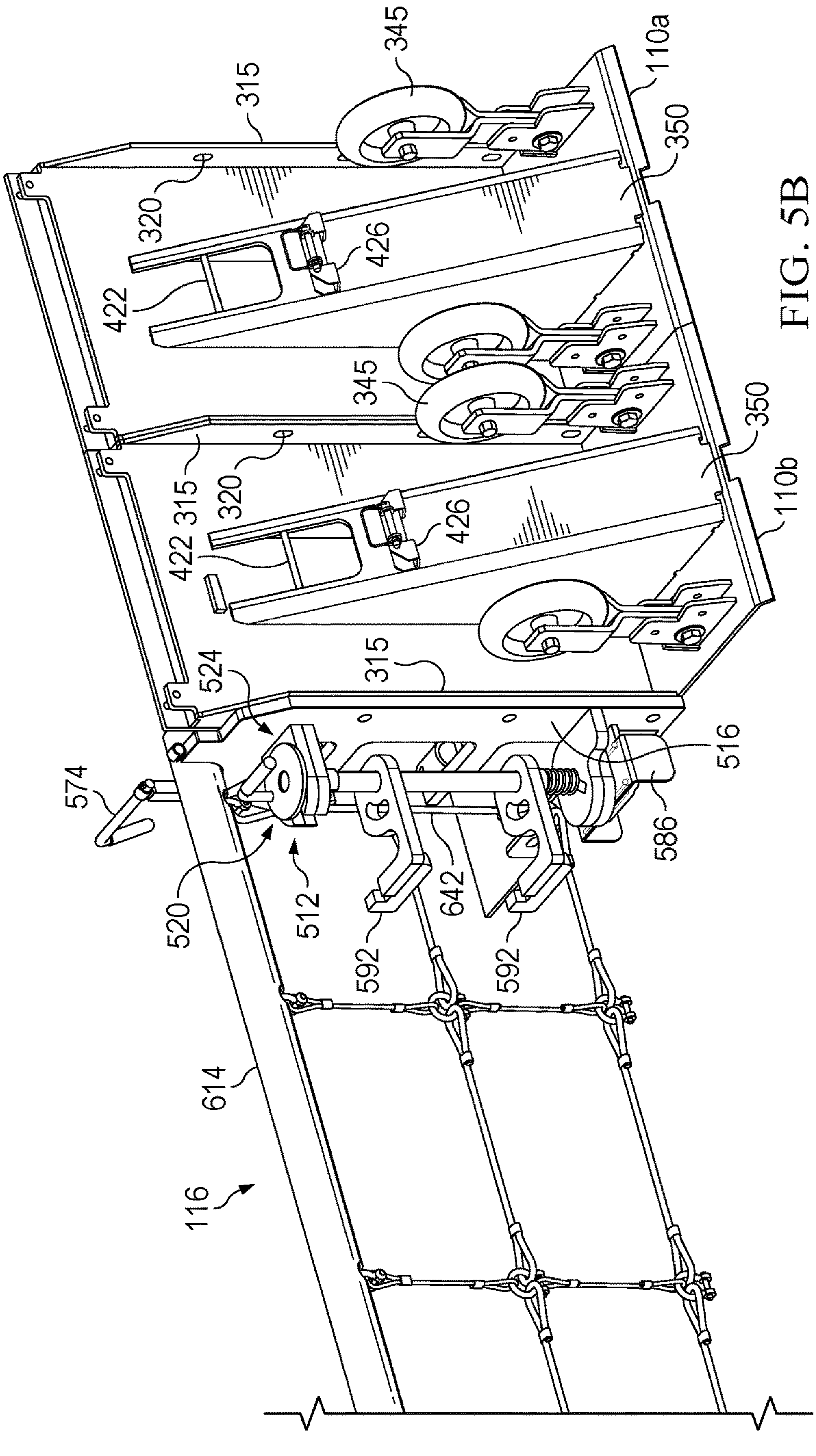
FIG. 5B represents an enlarged rear perspective view of the latch assembly in an open position, the latch assembly coupled to a portable barrier of the vehicle mitigation system of FIG. 1.
Figure 5C:
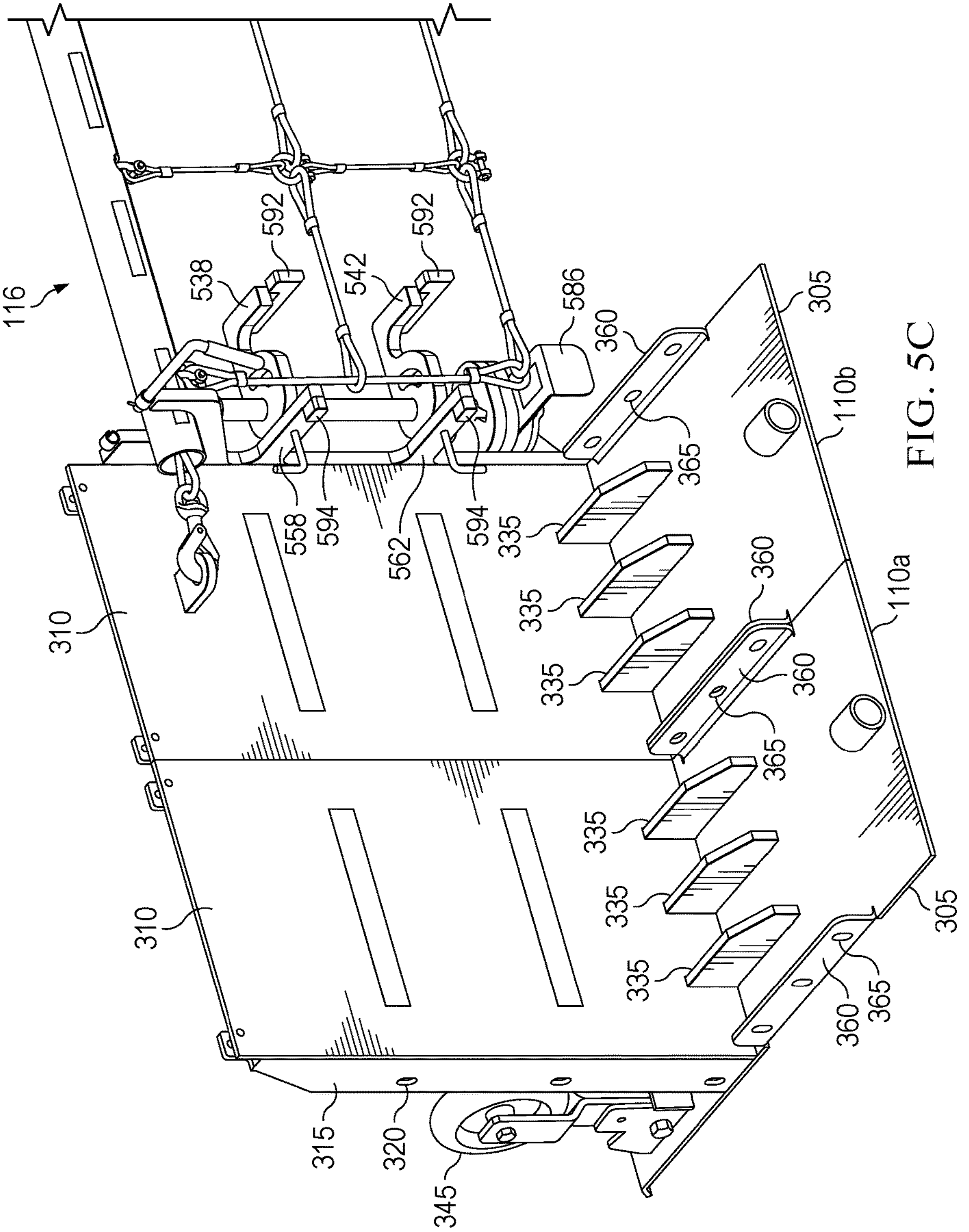
FIG. 5C represents an enlarged front perspective view of the latch assembly in the open position, the latch assembly coupled to a portable barrier of the vehicle mitigation system of FIG. 1.

FIGS. 3, 4, and 5A-5C illustrate perspective views of the portable barriers 110*a*, 110*b*, 110*c*, 110*d* on each side of the gap 120. While other portable barriers may effectively be deployed as part of the vehicle mitigation system 100, the illustrated portable barriers are particularly desirable due to the shape of the barriers and the barriers' ability, along with the gate assembly, to slow and stop vehicles. Portable barriers 110*a*, 110*b*, 110*c*, 110*d* are each generally L-shaped and include a base plate 305 for supporting the modular barrier on the surface 118 and an upwardly extending upright member 310 for receiving impact forces, and in some scenarios for providing munitions protection. A plurality of gussets 335 is provided on a first side of the upright member 310, which is illustrated in FIGS. 3 and 5C. Referring to FIG. 4, the barriers include vertically-oriented side plates 315 having apertures 320. The side plates 315 are integrally formed with, welded or otherwise attached to the upright member 310. A wheel assembly 345 is positioned on a second side of the upright member 310 coupled to the base plate 305. The wheels are pivotally coupled to brackets welded or otherwise attached to the base plate 305, and the wheels are movable between a disengaged, stored position shown in FIG. 4 and an engaged, transport position (not shown). In the engaged position, the wheels are extended near or into contact with the surface on which the barrier sits to allow transport of the portable barrier. The wheels may be selectively locked in either position by placing a pin (not shown) through apertures in the brackets that allow pivotal positioning of the wheels. A gusset assembly 350 is provided on the second side of the upright member 310 to provide extra strength and support between the upright member 310 and the base plate 305. A side plate 360 is provided along each edge of the base plate 305. The side plate 360 may be integrally formed with, welded or otherwise attached to the base plate. Similar to the vertically-oriented side plates 315, the side plates 360 include apertures 365. The vertically-oriented side plates 315 and the side plates 360 allow adjacent barriers to be rigidly, and preferably releasably, attached to one another. In the illustrated embodiment, bolts or other fasteners are passed through the apertures of the vertically-oriented side plates 315 and the side plate 360 to couple the barriers together.

The barriers 110*a*, 110*b*, 110*c*, 110*d* may each include a shield frame (not shown) capable of receiving and holding a shield (not shown) that may be used to convey information to motorists or pedestrians near the barriers. The shield may be comprised of weatherproof cardboard, paper, velum, vinyl or another material that is capable of displaying indicia to communicate information. Indicia may include cautionary messages such as "SLOW," "STOP," "CAUTION," or instead may contain information about the agency or department that is responsible for the deployment of the barriers such as "POLICE" or "DEPARTMENT OF TRANSPORTATION." In some embodiments, the shields may be used to convey advertising or other information.

Referring again to FIG. 3, the barrier 110*d* includes an arrestor plate 368 rigidly attached to or integrally formed with the barrier 110*d*. In the illustrated embodiment, the arrestor plate 368 is attached by bolts or other fasteners to the vertically-oriented side plate 315 of the barrier 110*d* on a side of the barrier 110*d* nearest the gate assembly 116. The arrestor plate 368 may include apertures or other openings that allow the arrestor plate 368 to be coupled to the barrier 110*d*. The arrestor plate 368 provides a base to which the main arrestor cables 624*b*, 624*c* (discussed below) from the gate assembly 116 may be attached. Slots or other apertures 370 through the arrestor plate 368 receive releasable hooks (e.g., releasable members 625) that are attached to the main arrestor cables 624*b*, 624*c*. The use of elongated slots 370 as illustrated in FIG. 3 provides the gate assembly 116 the ability to rotate freely without the main arrestor cables 624*b*, 624*c* of the gate assembly 116 becoming bound due to the attachment of the main arrestor cables 624*b*. 624*c* to the arrestor plate 368.

In other embodiments, the barrier may include the arrestor plate 368 in lieu of the vertically-oriented side plate 315 such that the arrestor plate 368 is integrally formed with, welded to, or attached to another part of the barrier, such as the base plate 305 or the upright member 310. Still another embodiment may omit the arrestor plate 368 from barrier 110*b* and instead provide apertures 370 integrated directly into another component of barrier such as on the upright member 310.

Referring to FIG. 4, a toolbox 414 or other storage box may be coupled to one of both of the barriers 110*c*, 110*d*. In the illustrated embodiment, the toolbox 414 is coupled to the gusset assembly 350 on barrier 110*c*. The toolbox 414 may have a hinged door 418 that is capable of being closed, and optionally locked. The toolbox 414 may be provided to store any types of tool or other equipment that may be used to assemble or disassemble the vehicle mitigation system. Examples of items stored in the toolbox may include wrenches, socket sets, screw drivers, mallets, and various fasteners.

While the gusset assembly 350 on barrier 110*d* is shown without a storage box, another tool or storage box may be similarly positioned on this barrier. Alternatively, a hauler used to move and position the barriers may be stored on the gusset assembly 350 of the barrier 110*d*, or on any barrier. The gusset assembly 350 may include a dowel 422 offset from the upright member 310 and a bracket 426 that allow the hauler (not shown) to be releasably coupled to the barrier 110*d*.

Referring to FIGS. 5A-5C, the barrier 110*b* includes a latch assembly 512 having a gate latch plate 516 rigidly attached to or integrally formed with the barrier 110*b*. In FIG. 5A, an enlarged rear perspective view of the latch assembly 512 is illustrated in a closed position, while FIG. 5B depicts an enlarged rear perspective view of the latch assembly 512 in an open position. FIG. 5C illustrates an enlarged front perspective view of the latch assembly 512 in the open position. In the illustrated embodiment, the gate latch plate 516 is attached by bolts or other fasteners to the vertically-oriented side plate 315 of the barrier 110*b* on a side of the barrier nearest the gate assembly 116. In other embodiments, the barrier 110*b* may include gate latch plate 516 in lieu of the vertically-oriented side plate 315 such that the gate latch plate 516 is integrally formed with, welded to, or attached to another part of the barrier, such as the base plate or the upright member. Still another embodiment may omit the gate latch plate 516 from barrier 110*b* and instead allow attachment of the latch assembly 512 directly to another component of the barrier such as on the upright member. In any of these examples, the securement or attachment of the gate assembly 116 to the latch assembly effectively is an attachment to the barrier 110*b* itself since forces applied to the gate assembly 116 will be transmitted to the barrier 110*b*.

Figure 5D:
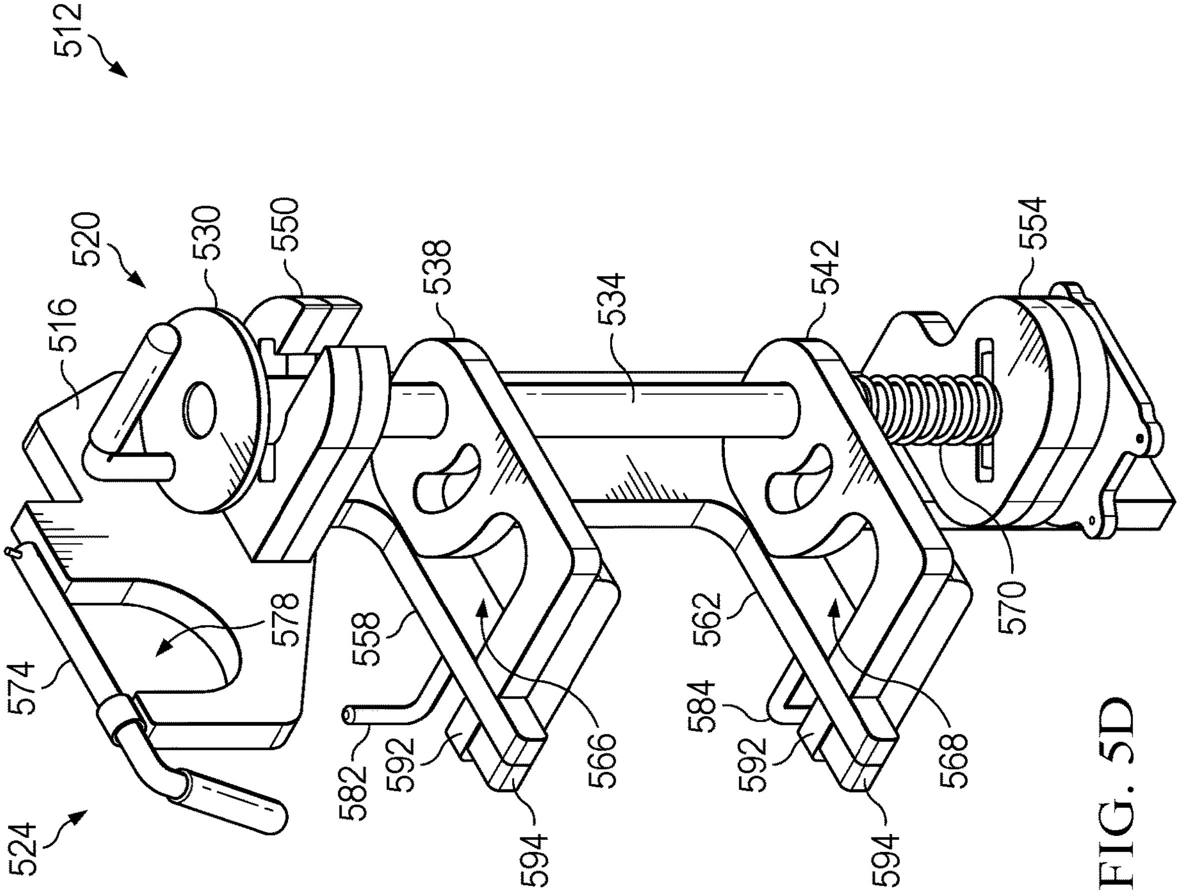
FIG. 5D represents a front perspective view of the latch assembly of FIG. 5A in the closed position.

Referring to FIG. 5D, a front perspective view of the latch assembly 512 without the barrier 110*b* is illustrated. The latch assembly 512 includes a locking pin assembly 520 and a cradle assembly 524. The cradle assembly 524 rotatably receives the locking pin assembly 520 such that an operator may rotate the locking pin assembly 520 into a locked or unlocked positon. The cradle assembly 524 further cooperates with the locking pin assembly 520 to receive portions of the gate assembly 116 when the gate assembly 116 is in the closed position.

The locking pin assembly 520 is illustrated in the locked position in FIG. 5D and includes a handle 530 joined to a pin 534. The pin 534 may be rigidly attached to a first arm 538 and a second arm 542 such that rotation of the pin 534 about its longitudinal axis results in rotation of the first arm 538 and second arm 542 about the same axis.

The cradle assembly 524 includes the gate latch plate 516 that was previously described as being joined to the barrier 110*b*. The cradle assembly 524 further includes an upper bearing arm 550 and a lower bearing arm 554, both extending from a surface of the gate latch plate 516 opposite the barrier 110*b*. The upper bearing arm 550 and lower bearing arm 554 both are configured to receive the pin 534 and allow the pin to rotate. The gate latch plate 516 further includes a first extension portion 558 and a second extension portion 562. When the latch assembly is in the closed position, the first arm 538 of the locking pin assembly 520 aligns with and abuts the first extension portion 558 to create a first closed aperture 566. Similarly, the second arm 542 of the locking pin assembly 520 aligns with and abuts the second extension portion 562 to create a second closed aperture 568. The first and second closed apertures 568 both receive a portion of the gate assembly 116 when the gate assembly is positioned in the closed position and the latch assembly 512 is in the closed position.

A spring 570 is positioned along the pin 534 between the second arm 542 and the lower bearing arm 554. The spring 570 exerts a biasing force upward on the locking pin assembly 520, which maintains the locking pin assembly in the locked position unless an operator exerts a downward force on the handle 530 and rotates the pin 534 counter-clockwise (viewed from above) to move the locking pin assembly 520 to the unlocked position shown in FIGS. 5B and 5C.

The latch assembly 512 further includes a sliding pin 574 that is movable relative to the gate latch plate 516 between an open and closed position. In the closed position, the sliding pin 574 abuts the gate latch plate 516 to create a top closed aperture 578. The top closed aperture 578 receives a portion of the gate assembly 116 when the gate assembly is positioned in the closed position and the latch assembly 512 is in the closed position. Additional hanger pins 582, 584 are coupled to the gate latch plate 516, providing additional attachment points for portions of the gate assembly 116 if desired.

Figure 5E:
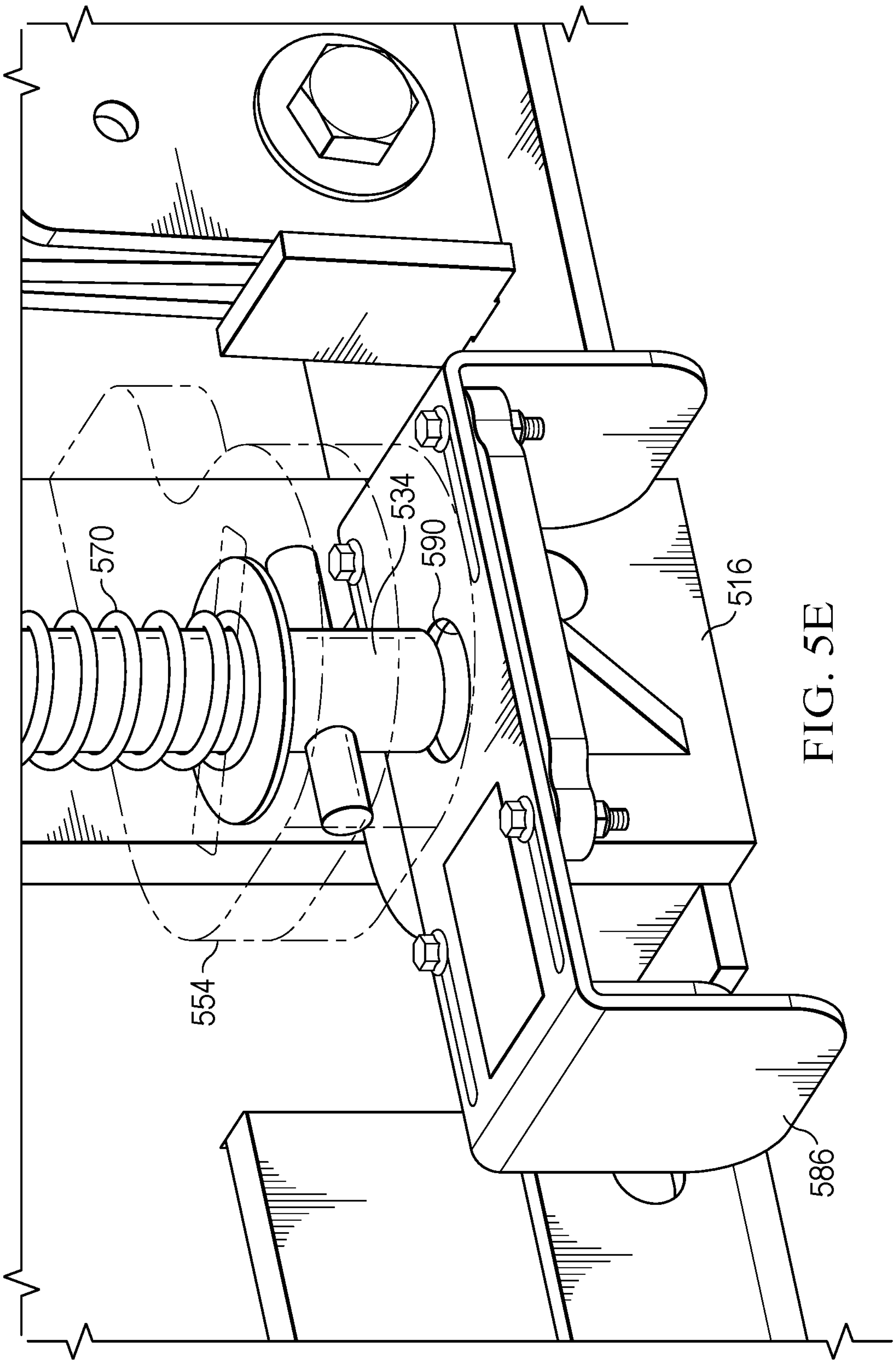
FIG. 5E represents an enlarged front perspective view of a kick plate of the latch assembly of FIG. 5A, the kick plate being shown in an unlocked position.
Figure 5F:
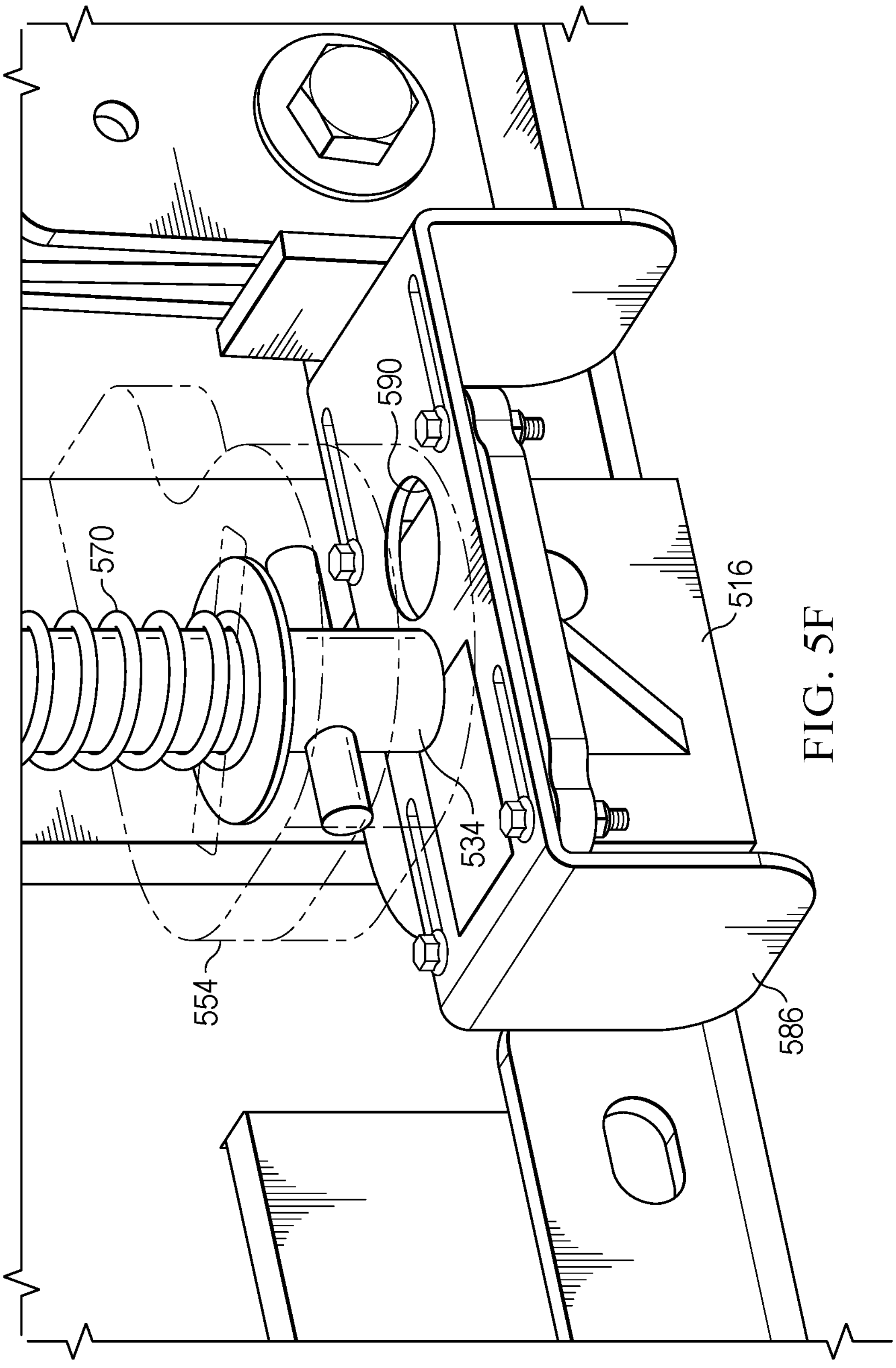
FIG. 5F represents an enlarged front perspective view of a kick plate of the latch assembly of FIG. 5A, the kick plate being shown in a locked position.

Referring to FIGS. 5E and 5F, an enlarged right side perspective view of the latch assembly 512 is illustrated. A kick plate 586 is positioned beneath the lower bearing arm 554 of the cradle assembly 524. The kick plate 586 is slidingly coupled to a ledge extending from the gate latch plate 516. The kick plate 586 is generally c-shaped and includes an aperture 590 that aligns with pin 534 in an unlocked position. In this unlocked position (see FIG. 5E), the location of the aperture 590 beneath the pin 534 allows the pin 534 to be moved downward, such that the bias of the spring 570 is overcome, and the pin rotated to move the locking pin assembly 520 into the unlocked position. In the locked position of the kick plate 586, the kick plate 586 has been moved such that the aperture 590 is not located beneath the pin 534 (see FIG. 5F). In this position, the pin 534 is prevented from moving downward and thus the locking pin assembly 520 is not capable of being moved to the unlocked position. The kick plate 586 provides an extra measure of safety to prevent inadvertent opening of the latch assembly 512 and release of the gate assembly 116 into an open position. The kick plate 586, by providing an additional step that has to occur before the gate can be opened, also makes it more difficult for unauthorized users not familiar with the vehicle mitigation system 100, such as pedestrians, to be able to open the gate assembly 116. The kick plate 586 is configured to be operated by the foot of an operator when it is desired to open the gate.

Referring to FIGS. 5A-5D, in one embodiment of the latch assembly 512, the strength of the latch assembly 512 may be greatly increased by providing an L-shaped locking member 592 rigidly coupled to each of the first arm 538 and the second arm 542. Each locking member 592 engages one of the first extension portion 558 and the second extension portion 562 of the gate latch plate 516 on three sides when the latch assembly 512 is placed in the closed position. Further, the gate latch plate 516, as illustrated in FIGS. 5C and 5D, also includes a locking tab 594 that is coupled to each of the first extension portion 558 and the second extension portion 562 of the gate latch plate 516. Alternatively, the locking tab 594 may be an integral part of the gate latch plate 516. The locking tab 594 also engages the locking member 592 of the first arm 538 and the second arm 542. The addition of these structural elements greatly strengthens the latch assembly 512 and reduces the likelihood of the latch assembly 512 becoming disengaged and releasing the gate assembly 116 during an impact event.

Figure 6:
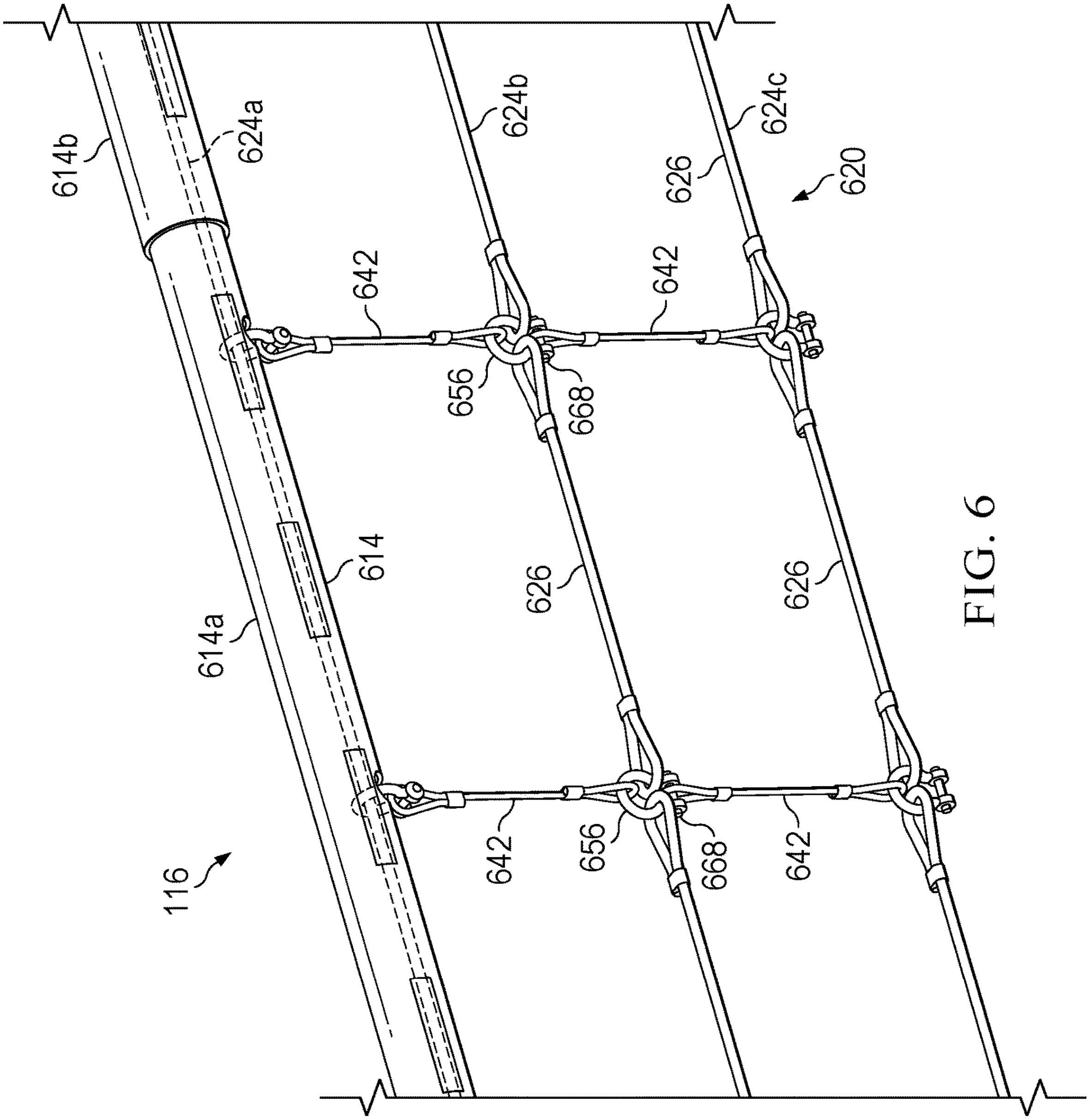
FIG. 6 represents an enlarged front perspective view of a gate assembly of the vehicle mitigation system of FIG. 1.
Figure 7:
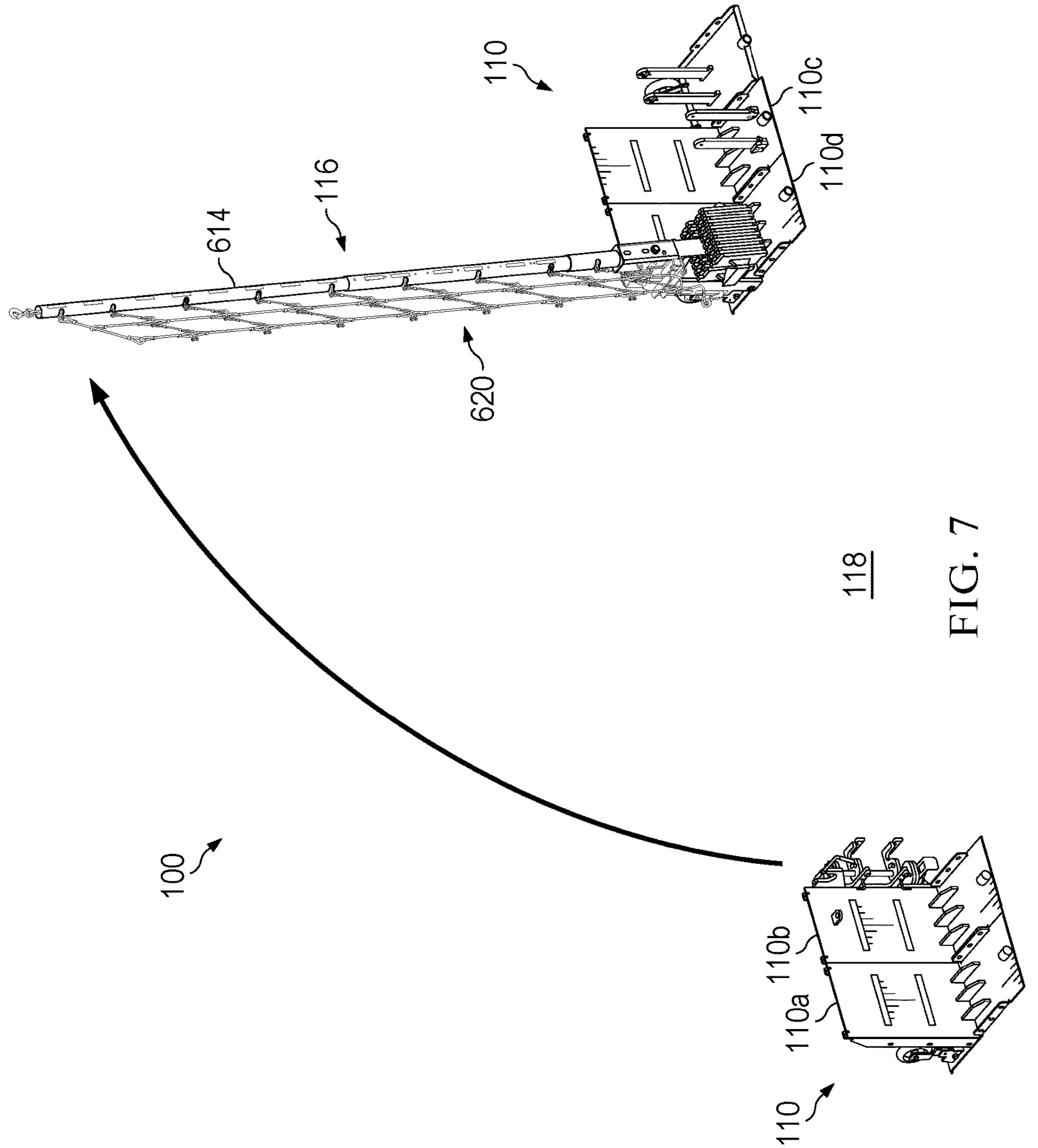
FIG. 7 represents the vehicle mitigation system of FIG. 1 in an open position.

Referring again to FIGS. 1 and 2, but also to FIG. 6, the gate assembly 116 includes a beam 614 pivotally attached to the portable barrier 110*b* such that the beam 614 (and the gate assembly 116 itself) is capable of being rotated between a closed position (FIGS. 1 and 2) and an open position (FIG. 7). In an embodiment, the beam 614 is an elongated member that is substantially parallel to the surface 118 when the beam and gate assembly 116 are in the closed position. The open position indicates a position where the beam 164 is no longer parallel to the surface 118. In one embodiment, the open position may be reached when the beam is substantially perpendicular to the surface 118; however, the open position could instead be a position that is less than a full ninety (90) degree articulation of the beam 164 from its closed position. Movement of the beam 164 from the closed position to the open position involves rotating the beam 164 in a vertical direction away from the surface 118.

While the beam 614 could be comprised of a single length of square or round tubing or bar stock, in some embodiments, the beam 614 is comprised of a plurality of beam sections (e.g., 614*a*, 614*b*) with each beam section coupled to an adjacent beam section. In the illustrated embodiment, the beam sections may be coupled by bolts or other fasteners that are selectively removable when the beam 614 is to be disassembled. When the vehicle mitigation system 100 is not in use, disassembled beam sections may be stored in a storage box (not shown). The storage box may by mounted to one of the barriers 110 or may be stored or transported separately from the barriers 110.

The various beam sections may be sized differently to allow the beam sections to be more easily connectable. As illustrated in FIGS. 1, 2, and 6, beam section 614*a* may be made from round tubing having a diameter of a first size, and beam section 614*b* may be made from round tubing having a diameter of a second size that is larger than the first size. Preferably, in this embodiment the outer diameter of the smaller tubing is smaller than the inner diameter of the larger tubing such that the smaller tubing nests within and is received by the larger tubing. Apertures near the end of each beam section may allow the nested tubes to be coupled and secured by bolts or other fasteners. By reducing the size of certain sections and allowing a portion of those beam sections to be received by the larger beam sections, the overall strength and stability of the gate assembly is increased.

The sectional nature of the beam 164 also allows for modularity so that the beam 164 can be sized to different lengths to span gaps of greater or lesser distance, depending on the site requirements of the area being protected by the vehicle mitigation system 100. Although the lengths of each individual section could vary, in one embodiment, each beam section is 72 inches long, and a total of two sections are provided. This allows the beam 614 to be selectively assembled to a length of about 12 feet. In other embodiments, either additional sections could be provided with the vehicle mitigation system 100, or the length of individual sections could be changed to allow the beam to span gaps of greater or lesser distance than the preferred 12 feet. The modularity of the beam 614 may also be achieved by alternative configurations such as a series of telescoping tubes that use either external fasteners (such as bolts) or internal spring loaded buttons that are selectively depressed to allow extension of the telescoping tubes and then extend into an aperture when a desired and predetermined amount of extension is achieved. Again, in this embodiment, the overall length of the beam 614 could be adjusted depending on how large a gap is needed between the barriers 110.

Although the beam 614 illustrated includes a round cross section, the cross-sectional profile of the beam 614 could be square, rectangular or any other shape. In some embodiments, the beam 614 could even be comprised of one or more sections of angled (i.e., L-shaped or U-shaped) material such as angle iron or angle aluminum. The type of material used for the beam 614 could also vary. While metal such as steel or aluminum may be the more preferable choice, in some embodiments, the beam material may be a composite, carbon fiber, or polymer material.

FIG. 6 illustrates an enlarged front perspective view of a portion of the gate assembly 116. The gate assembly 116 includes an arrestor net 620 formed by a plurality of interconnected arrestor cables. The net 620 is preferably coupled to the beam 614 such that the beam 614 carries the net as the beam is moved between the open and closed positions. By supporting the net 620, the beam 614 also keeps the arrestor net 620 hanging in an organized and untangled manner that facilitates quick connection of the net to the barriers 110*b*, 110*d* on both sides of the gap. The arrestor net 620 includes a plurality of main arrestor cables 624*a*, 624*b*, 624*c* that are generally arranged substantially parallel to the beam 614. In the illustrated embodiment, three main arrestor cables 624*a*, 624*b*, 624*c* are provided. In the illustrated embodiment, the uppermost main arrestor cable 624*a* is positioned within a passageway of the beam 614 itself. Alternatively, the uppermost main arrestor cable 624*a* could be positioned outside of and adjacent to the beam 614 and coupled to the beam 614 by rings, shackles or other hardware. In some embodiments, fewer main arrestor cables may be provided, or to provide additional resistance to vehicle incursions, more than three main arrestor cables may be provided.

The main arrestors cables 624*a*, 624*b*, 624*c* are each attached on both ends to one of the barriers 110*b*, 110*d*. On the end of the cables nearest barrier 110*d*, the main arrestor cables preferably include a releasable member 625 (see FIG. 3) at an end of the main arrestor cable that allows for the cables to be releasably and coupled to the barrier 110*d*. In the illustrated embodiment, the releasable member 625 is a high-strength hook with a clasp that allows the hook to be passed through the slots 370 on the arrestor plate 368 on the barrier 110*d* and then secured by the clasp. The clasp may or may not be spring biased to close, and the releasable member 625 may further include a swivel to allow the releasable member 625 to rotate without twisting the cable to which it is attached. As mentioned previously, the barrier 110*d* includes apertures or opening that may be provided in the arrestor plate 368 and that receives the releasable members 642 of the main arrestor cables 624*a*, 624*b*, 624*c* when attached. Preferably, the main arrestor cables 624*a*, 624*b*, 624*c* will remain attached to the arrestor plate 368 even when the gate assembly 116 is opened. The use of slots 370 on the arrestor plate 368 allows the arrestor cables to remain attached to the arrestor plate 368 (and thus barrier 110*d*) even when the gate assembly 116 is opened. As explained in more detail below, the arrestor net 620 is releasably attached to the barrier 110*b* (via a latch assembly) at an end of the arrestor net 620 nearest barrier 110*b*. The main arrestor cable 624*a* is also releasably attached to a first connector that is coupled to or a part of the barrier 110*b*.

Each of the main arrestor cables 624*a*, 624*b*, 624*c* may be a single continuous cable spanning the gap between the barriers 110*b*, 110*d*, or alternatively, one or more of the arrestor cables may be comprised of a plurality of cable sections. In the embodiment illustrated in FIG. 6, the uppermost main arrestor cable 624*a* is a single continuous cables with crimp-retained loops on each end that allow attachment of the cable to the releasable member 625 or other cables that are part of the arrestor net 620. The other two main arrestor cables 624*b*, 624*c* each are comprised of multiple cable sections 626, which in one embodiment may be 2 ft sections of cable. Each cable section 626 includes a crimp-retained looped formed on both ends. This facilitates coupling of a cable section to adjacent cable sections 626. The use of the term "main arrestor cable" herein is meant to encompass both configurations—a continuous cable that spans the entire gap between the barriers and a cable that has a plurality of discrete sections that are coupled together to span the gap. In either configuration, the arrestor net 620 may be adjusted to match the desired gap between the barriers 110, either by using more sections 626 of cable or by providing multiple lengths of continuous cables such as main arrestor cable 624*a*.

Connected between the main arrestor cables 624*a*, 624*b*, 624*c* are a plurality of lateral arrestor cables 642. The lateral arrestor cables 642 are generally assembled in an orientation that is substantially perpendicular to the beam 116 and the main arrestor cables 624*a*, 624*b*, 624*c*. Like the main arrestor cables 624*a*, 624*b*, 624*c*, the lateral arrestor cables 642 may be a single continuous cable that extends from the beam 116 (or alternatively the uppermost main arrestor cable 624*a*) to the lowermost main arrestor cable 624*c*, or instead, the lateral arrestor cables 642 may include a plurality of cable sections. In the illustrated embodiment, discrete cable sections are used between each of the main arrestor cables 624*a*, 624*b*, 624*c*. Each section of the lateral arrestor cables 642 may include a crimp-retained loop on each end of the section to allow attachment to each main arrestor cable and to the vertically-adjacent, lateral arrestor cable sections. In FIG. 6, U-bolts or shackles 656 are provided to connect adjacent sections of lateral arrestor cables 642 and to connect the lateral arrestor cables 642 to the main arrestor cables 624*a*, 624*b*, 624*c*. The shackles 656 are high-strength hardware capable of handling the forces encountered during a vehicle incursion. In some embodiments, the shackles 656 may include a closed-eyelet clamp or screw pin 668 that allows for simple assembly and securement of the various cable sections. In other embodiments, hooks, carabineers or other hardware may be used as an alternative to the illustrated shackles 656.

Referring again to FIGS. 3 and 4, the gate assembly 116 and beam 614 further include an end support member 372 that is coupled to a pivot arm assembly 374. The pivot arm assembly 374 includes an axle 376 joined to a pivot arm 378. The pivot arm 378 is joined to a counterweight platform 382. The counterweight platform 382 can accommodate counterweights such as a plurality of weighted plates, or ingots 384. In the embodiment illustrated in FIG. 3, the counterweight platform includes a plurality of guides 386 that pass through apertures in the weighted plates 384 such that the plates 384 are secured to the counterweight platform 382. The number of weighted plates 384 positioned on the counterweight platform 382 will vary depending on the length and weight of the gate assembly. Preferably, it is desired to allow the gate assembly 116 to rotate freely and easily to the open position when the latch assembly 512 is opened.

The weighted plates 384 may be stored or transported to the site on an ingot cart 388. The ingot cart 388 may also have a plurality of guides 390 that assist in securing the weighted plates 384. The ingot cart 388, similar to the barriers, includes wheels 392 that permit a single person to easily move the ingot cart 388 with a hauler or tow bar.

The gate assembly 116 is pivotally attached to the barrier 110*d* by passing the axle 376 of the pivot arm assembly 374 through an aperture or pivot support assembly 394 mounted to the barrier 110*d*. The pivot support assembly 394 may include one or more bearings or bushings surrounding an aperture that allow for smooth rotation of the axle 376 relative to the barrier 110*d*. While the axle 376 has been described as being a part of the pivot arm assembly 374, the axle 376 instead could be coupled to the barrier 110*d* with a corresponding bearing assembly or aperture provided on the beam 614 or pivot arm assembly 374. Alternatively, both the barrier 110*d* and the beam 614 could have apertures with a separate axle provided to link the two.

Referring again to FIGS. 5A and 5B, the capture and locking of the gate assembly 116 to the barrier 110*b* in the closed position is discussed in more detail. When the gate assembly 116 is in the open position, the latch assembly 512 preferably also stays open as illustrated in FIG. 5B. When the gate assembly 116 is lowered into the closed positioned (also illustrated in FIG. 5B), the beam 614 is received in the top closed aperture 578 of the gate latch plate 516. The endmost lateral arrestor cable 642 closest to the barrier 110*b* is positioned in a vertical orientation as the beam 614 is cradled by the gate latch plate 516. The operator of the gate moves the sliding pin 574 to hold the beam in the top closed aperture 578. The operator then presses downward on the handle 530 and rotates the locking pin assembly 520 clockwise (looking from above) to the locked position (see FIG. 5A). The rotation of the locking pin assembly moves the first arm 538 of the locking pin assembly 520 into contact with the first extension portion 558 to capture the endmost lateral arrestor cable 642 in the first closed aperture 566. Similarly, the lateral arrestor cable 642 is also captured within the second closed aperture 568 by the second arm 542 contacting the second extension portion 562. After capturing the arrestor cable 642, the operator allows the locking pin assembly 520 to move back in an upward direction under the biasing force of the spring 570. The operator then moves the kick plate 586 into the locked position to prevent the locking pin assembly 520 from inadvertently moving into the unlocked position. This series of steps is reversed to open the latch assembly 512 and move the gate assembly 116 into the open position.

FIG. 7 depicts configurations of the vehicle mitigation systems with the gate assembly 116 positioned in the open position. In FIG. 6, the gate assembly 116 has been uncoupled from the barrier 110*b*, and the gate assembly has been moved from the closed position (FIG. 1) vertically upward toward the open position.

Together, the barriers 110 and gate assembly 116 serve as a mobile system that is capable of absorbing the kinetic energy of a vehicle to slow or stop the vehicle. The gate assembly 116 may be opened to allow authorized vehicle traffic or pedestrians to pass between the barriers 110, or the gate assembly 116 may be closed to allow the arrestor net 620 (or arrestor cables) to be connected to the barriers 110, thereby securely spanning the gap between the barriers 110. While one purpose of the beam is to carry the arrestor net/cables between the closed and opened positions of the gate assembly 116, the beam could also serve to absorb the kinetic energy of a vehicle, especially if the beam were connected to the barriers on both sides of the gap.

When the gate assembly 116 is closed and is engaged by a vehicle, the arrestor net 620 is the first impediment that the vehicle likely encounters. The high-strength properties of the arrestor cables and hardware reduce the likelihood that any of the cables break when contacted by the vehicle. As the vehicle moves forward into the arrestor net 620, the forward force of the vehicle is transferred through the arrestor net 620 to the barriers 110 on either side of the arrestor net 620. The weight of the barriers 110 resists the forward force (and motion) of the vehicle, and as the vehicle moves forward into the arrestor net 620, the barriers 110 are in many instances dragged inward toward the vehicle, and the arrestor net 620 and barriers 110 cradle the vehicle. This cradling of the vehicle, coupled with the weight of the barriers ultimately either significantly slow or stop the vehicle.

In some instances, when a vehicle approaches the vehicle mitigation system 100 in a manner that does not engage the arrestor net 620 (i.e., when the vehicle first strikes one of the barriers to either side of the gap), the barriers are configured to slow or stop the vehicle in a manner similar to that where an individual portable barrier is used to provide security. An example of the barriers used with the presently described vehicle mitigation system 100 is the Archer 1200™ barrier sold by Meridian Rapid Defense Group LLC.

The Manual for Assessing Safety Hardware (MASH) presents uniform guidelines for crash testing permanent and temporary highway safety features. Crash testing was performed according to MASH 2016 Test Level 2-41 on the vehicle mitigation system 100 illustrated in FIG. 1. The testing verified the ability of the vehicle mitigation system 100 to stop a vehicle weighing 5050 pounds traveling at 44 mph in 52 ft. The testing verified that the vehicle mitigation system 100 met all the requirements for MASH 2016 Test Level 2-41.

In one exemplary application, the vehicle mitigation systems described herein may be deployed in a construction zone. In another exemplary application, the vehicle mitigation systems may be deployed in an overhead power line construction site. In another exemplary application, the vehicle mitigation systems may be deployed at a manhole construction site. The vehicle mitigation systems may be used in typical traffic management applications for several scenarios including events, bridge construction, diversions, detours, road closures, lane closures, protective security, mass gatherings, building sites, mines, parks and sportsgrounds and road maintenance. In addition to preventing the unwanted intrusion of unauthorized vehicles and traffic, through the use of the movable gate assembly, the vehicle mitigation systems allows selective access for emergency and authorized vehicles.

In addition to the embodiments and examples of a vehicle mitigation system provided above, the following are illustrative examples of a vehicle mitigation system.

Example 1. A vehicle mitigation system comprises a first portable barrier, a second portable barrier, and a gate assembly comprising a beam. The gate assembly is pivotally attached to the second portable barrier, and the beam is capable of rotating between a closed position and an open position. The beam in the closed position is substantially parallel to a surface on which the first and second portable barriers are positioned. The beam in the open position is no longer parallel to the surface and has been raised vertically away from the surface. The gate assembly has at least one arrestor cable attached between the first portable barrier and the second portable barrier such that the arrestor cable spans a distance between the first and second portable barriers.

Example 2. The example of claim 1, wherein the gate assembly further comprises a net formed by a plurality of interconnected arrestor cables.

Example 3. The system of example 1, wherein the gate assembly further comprises a net formed by a plurality of interconnected arrestor cables, and the net is coupled to the beam such that the beam carries the net as the beam is moved between the open and closed positions.

Example 4. The system of examples 2 or 3, wherein the plurality of interconnected arrestor cables further comprises a first main arrestor cable extending between the first barrier and the second barrier, a second main arrestor cable extending between the first barrier and the second barrier, and a plurality of lateral arrestor cables. Each lateral arrestor cable is coupled to the first main arrestor cable and the second main arrestor cable.

Example 5. The system of example 4, wherein the first main arrestor cable is positioned within a passageway of the beam.

Example 6. The system of example 4, wherein the first main arrestor cable and the second main arrestor cable are substantially parallel to the beam.

Example 7. The system of example 4, wherein the first main arrestor cable and the second main arrestor cable are each releasably coupled to the first barrier or coupled to a lateral arrestor cable that is coupled to the first barrier.

Example 8. The system of any of examples 4-7, wherein the first main arrestor cable and the second main arrestor cable each comprise a releasable hook to permit releasable coupling to the first barrier.

Example 9. The system of any of examples 1-8, wherein the beam further comprises a plurality of beam sections, each beam section coupled to an adjacent beam section.

Example 10. The system of any of examples 1-9, wherein the beam further comprises at least one first beam section of a first size and at least one second beam section of a second size; the second size is smaller than the first size, allowing the second beam section to be received by an adjacent first beam section; and the first beam section is coupled to the adjacent second beam section.

Example 11. The system of any of examples 1-10, wherein the gate assembly further comprises an end support member coupled to the beam near an end of the beam nearest the second barrier.

Example 12. The system of example 11, wherein the gate assembly being pivotally attached to the second barrier further comprises the end support member being pivotally attached to the second barrier.

Example 13. The system of any of examples 1-12 wherein the first portable barrier further comprises a first inner barrier having a base plate and an upright member coupled to the base plate, and a first outer barrier having a base plate and an upright member coupled to the base plate. The first inner barrier is coupled to the first outer barrier. The second portable barrier further comprises a second inner barrier having a base plate and an upright member coupled to the base plate, and a second outer barrier having a base plate and an upright member coupled to the base plate. The second inner barrier is coupled to the second outer barrier.

Example 14. A vehicle mitigation system comprises a first portable barrier, a second portable barrier, and a gate assembly. The gate assembly comprises a beam pivotally attached to the second portable barrier. The beam is capable of rotating between a closed position and an open position such that the beam moves vertically away from a surface on which the first and second portable barriers are positioned. The gate assembly further comprises an arrestor net coupled to the beam such that the beam carries the net as the beam is moved between the open and closed positions. The arrestor net has a first main arrestor cable extending between the first barrier and the second barrier, a second main arrestor cable extending between the first barrier and the second barrier, and a plurality of lateral arrestor cables. Each lateral arrestor cable is coupled to the first main arrestor cable and the second main arrestor cable.

Example 15. A method of slowing a vehicle comprises deploying a first portable barrier and a second portable barrier, the first and second portable barriers separated by a spacing distance; moving a gate assembly from an open position to a closed position, the gate assembly having a beam pivotally attached to the second portable barrier such that the beam in the closed position is substantially parallel to a surface on which the first and second portable barriers are positioned, and in the open position is no longer parallel to the surface, the gate assembly having an arrestor net coupled to the beam such that the beam carries the net as the beam is moved between the open and closed positions; and attaching a portion of the arrestor net to the first portable barrier.

Example 16. The method of example 15, wherein the arrestor net is also attached to the second portable barrier.

Example 17. The method of example 15 or 16 further comprising disconnecting the portion of the arrestor net from the first portable barrier, and moving the gate assembly from the closed position to the open position.

Example 18. The method of any of examples 15-17, wherein attaching a portion of the arrestor net to the second portable barrier further comprises attaching a first main arrestor cable of the arrestor net to the second portable barrier, and attaching a second main arrestor cable of the arrestor net to the second portable barrier. Both the first main arrestor cable and the second main arrestor cable are also attached to the first portable barrier to span the spacing distance.

Example 19. The method of any of examples 15-18 further comprising releasably securing an end of the beam opposite the pivotal attachment to the first portable barrier when the beam in in the closed position.

Example 20. A vehicle mitigation system comprising a first portable barrier, a second portable barrier, a gate assembly and a latch assembly. The gate assembly includes a beam and an arrestor net positionable between the first barrier and the second barrier. The beam is pivotally coupled to the second barrier such that the gate assembly is rotatable from a closed position to an open position. The latch assembly is coupled to the first barrier, the latch assembly moveable from an open position to a closed position when the gate assembly is in the closed position. The latch assembly in the closed position secures at least one of the beam and the arrestor net to the first barrier.

Although the present disclosure and its advantages have been described in detail, it should be understood that various changes, substitutions and alterations can be made herein without departing from the spirit and scope of the disclosure as defined by the following claims.

What is claimed is:

1. A vehicle mitigation system comprising:

a first portable barrier;

a second portable barrier comprising an arrestor plate extending vertically along a side of the second portable barrier; and a gate assembly comprising a beam, the gate assembly pivotally attached to the second portable barrier, the beam capable of rotating between a closed position and an open position, the beam in the closed position being substantially parallel to a surface on which the first and second portable barriers are positioned, the beam in the open position no longer being parallel to the surface and having been raised vertically away from the surface, the gate assembly having a net formed by a plurality of interconnected arrestor cables attached between the first portable barrier and the second portable barrier such that the net spans a distance between the first and second portable barriers, wherein the plurality of interconnected arrestor cables comprise:

a first main arrestor cable extending between the first portable barrier and the second portable barrier and positioned within a passageway of the beam;

a second main arrestor cable extending between the first portable barrier and the second portable barrier and disposed below and substantial parallel to the first main arrestor cable;

a third main arrestor cable extending between the first portable barrier and the second portable barrier and disposed below and substantial parallel to the second main arrestor cable;

a plurality of lateral arrestor cables, each lateral arrestor cable coupled to at least the first main arrestor cable and the second main arrestor cable;

the first main arrestor cable is releasably coupled to the first portable barrier via a first hook coupled to an end of the first main arrestor cable;

the second main arrestor cable is releasably coupled to the arrestor plate on the second portable barrier via a second hook; and the third main arrestor cable is releasably coupled to the arrestor plate on the second portable barrier via a third hook.

2. The system of claim 1, wherein the first main arrestor cable and the second main arrestor cable are substantially parallel to the beam.

3. The system of claim 1, wherein the beam further comprises a plurality of beam sections, each beam section coupled to an adjacent beam section.

4. The system of claim 1, wherein:

the beam further comprises at least one first beam section of a first size and at least one second beam section of a second size;

the second size is smaller than the first size, allowing the second beam section to be received by an adjacent first beam section; and the first beam section is coupled to the adjacent second beam section.

5. The system of claim 1, wherein the gate assembly further comprises an end support member coupled to the beam near an end of the beam nearest the second portable barrier.

6. The system of claim 5, wherein the gate assembly being pivotally attached to the second portable barrier further comprises the end support member being pivotally attached to the second portable barrier.

7. The system of claim 1, wherein:

the first portable barrier further comprises:

a first inner barrier having a base plate and an upright member coupled to the base plate;

a first outer barrier having a base plate and an upright member coupled to the base plate;

wherein the first inner barrier is coupled to the first outer barrier;

the second portable barrier further comprises:

a second inner barrier having a base plate and an upright member coupled to the base plate; and a second outer barrier having a base plate and an upright member coupled to the base plate;

wherein the second inner barrier is coupled to the second outer barrier.

8. The system of claim 1, wherein the arrestor plate comprises at least two slots.

9. The system of claim 8, wherein the at least two slots comprise a first slot configured to be coupled by the second hook on the second main arrestor cable, and a second slot configured to be coupled by the third hook on the third main arrestor cable.

10. A vehicle mitigation system comprising:

a first portable barrier;

a second portable barrier comprising an arrestor plate extending vertically along a side of the second portable barrier; and a gate assembly comprising:

a beam pivotally attached to the second portable barrier, the beam capable of rotating between a closed position and an open position such that the beam moves vertically away from a surface on which the first and second portable barriers are positioned while rotating from the closed position to the open position; and an arrestor net coupled to the beam such that the beam carries the arrestor net as the beam is moved between the open and closed positions, the arrestor net having a first main arrestor cable extending between the first portable barrier and the second portable barrier and positioned within a passageway of the beam, a second main arrestor cable extending between the first portable barrier and the second portable barrier, a third main arrestor cable extending between the first barrier and the second portable barrier, and a plurality of lateral arrestor cables, wherein the lateral arrestor cables are coupled to and between the first main arrestor cable and the second main arrestor cable, coupled to and between the second main arrestor cable and the third main arrestor cable, or a combination thereof, wherein the arrestor net further comprises:

the second main arrestor cable extending below and substantial parallel to the first main arrestor cable;

the third main arrestor cable extending below and substantial parallel to the second main arrestor cable;

the first main arrestor cable is releasably coupled to the first portable barrier via a first hook coupled to an end of the first main arrestor cable;

the second main arrestor cable is releasably coupled to the arrestor plate on the second portable barrier via a second hook; and the third main arrestor cable is releasably coupled to the arrestor plate on the second portable barrier via a third hook.

11. The system of claim 10, wherein the arrestor plate comprises at least two slots.

12. The system of claim 11, wherein the at least two slots comprise a first slot configured to be coupled by the second hook on the second main arrestor cable, and a second slot configured to be coupled by the third hook on the third main arrestor cable.

13. A method of slowing a vehicle comprising:

deploying a first portable barrier and a second portable barrier, the first and second portable barriers separated by a spacing distance, and wherein the second portable barrier comprises an arrestor plate extending vertically along a side of the second portable barrier;

moving a gate assembly from an open position to a closed position, the gate assembly having a beam pivotally attached to the second portable barrier such that the beam in the closed position is substantially parallel to a surface on which the first and second portable barriers are positioned, and in the open position is no longer parallel to the surface, the gate assembly having an arrestor net coupled to the beam such that the beam carries the arrestor net as the beam is moved between the open and closed positions; wherein the arrestor net comprises a plurality of interconnected arrestor cables further comprising:

a first main arrestor cable extending between the first portable barrier and the second portable barrier and positioned within a passageway of the beam;

a second main arrestor cable extending between the first portable barrier and the second portable barrier and disposed below and substantial parallel to the first main arrestor cable;

a third main arrestor cable extending between the first portable barrier and the second portable barrier and disposed below and substantial parallel to the second main arrestor cable;

a plurality of lateral arrestor cables, each lateral arrestor cable coupled to at least the first main arrestor cable and the second main arrestor cable;

the first main arrestor cable is releasably coupled to the first portable barrier via a first hook coupled to an end of the first main arrestor cable;

the second main arrestor cable is releasably coupled to the second portable barrier via a second hook; and the third main arrestor cable is releasably coupled to the second portable barrier via a third hook; and attaching a first portion of the arrestor net to the first portable barrier.

14. The method of claim 13, wherein the first portion of the arrestor net is attached to the first portable barrier by the first hook.

15. The method of claim 14, further comprising:

disconnecting the first portion of the arrestor net from the first portable barrier; and moving the gate assembly from the closed position to the open position.

16. The method of claim 13, further comprising attaching a second portion of the arrestor net to the second portable barrier which comprises:

attaching the second hook of the second main arrestor cable to the second portable barrier; and attaching the third hook of the third main arrestor cable to the second portable barrier.

17. The method of claim 16, wherein:

the arrestor plate comprises a first slot and a second slot;

the second hook on the second main arrestor cable is attached by coupling to the first slot; and the third hook on the third main arrestor cable is attached by coupling to the second slot.

18. A vehicle mitigation system comprising:

a first portable barrier;

a second portable barrier comprising an arrestor plate extending vertically along a side of the second portable barrier, wherein the arrestor plate comprises at least two slots;

a gate assembly having a beam and an arrestor net positionable between the first portable barrier and the second portable barrier, the beam pivotally coupled to the second portable barrier such that the gate assembly is rotatable from a closed position to an open position, wherein the arrestor net comprises a plurality of interconnected arrestor cables further comprising:

a first main arrestor cable extending between the first portable barrier and the second portable barrier and positioned within a passageway of the beam;

a second main arrestor cable extending between the first portable barrier and the second portable barrier and disposed below and substantial parallel to the first main arrestor cable;

a third main arrestor cable extending between the first portable barrier and the second portable barrier and disposed below and substantial parallel to the second main arrestor cable;

a plurality of lateral arrestor cables, each lateral arrestor cable coupled to at least the first main arrestor cable and the second main arrestor cable;

the first main arrestor cable is releasably coupled to the first portable barrier via a first hook coupled to an end of the first main arrestor cable;

the second main arrestor cable is releasably coupled to the second portable barrier via a second hook; and the third main arrestor cable is releasably coupled to the second portable barrier via a third hook; and a latch assembly coupled to the first portable barrier, the latch assembly moveable from an open position to a closed position when the gate assembly is in the closed position, the latch assembly in the closed position securing at least one of the beam and the arrestor net to the first portable barrier;

wherein the at least two slots of the arrestor plate comprise a first slot configured to be coupled by the second hook on the second main arrestor cable, and a second slot configured to be coupled by the third hook on the third main arrestor cable.

* * * * *